United States Patent [19]
Brown et al.

[11] Patent Number: 5,984,847
[45] Date of Patent: Nov. 16, 1999

[54] SELF LOADING CONTROLLED DEFLECTION ROLL

[75] Inventors: Dale A. Brown, Milton, Wis.; Arnold J. Roerig, Gold Canyon, Ariz.

[73] Assignee: Beloit Technologies, Inc., Wilmington, Del.

[21] Appl. No.: 08/980,191

[22] Filed: Nov. 26, 1997

Related U.S. Application Data

[63] Continuation of application No. 08/291,381, Aug. 16, 1994, abandoned.

[51] Int. Cl.⁶ .................................................... B21B 13/02
[52] U.S. Cl. ...................................... 492/7; 492/20; 492/2
[58] Field of Search ................................. 492/2, 16, 6, 7, 492/20; 162/358.1, 272

[56] References Cited

U.S. PATENT DOCUMENTS

| | | | |
|---|---|---|---|
| 3,340,140 | 9/1967 | Heys | 162/358.1 |
| 3,565,759 | 2/1971 | Notbohm et al. | 162/358.1 |
| 3,838,480 | 10/1974 | Depuy | 472/7 |
| 4,000,979 | 1/1977 | Biondetti | 492/2 |
| 4,520,723 | 6/1985 | Pav et al. | 100/162 |
| 4,657,637 | 4/1987 | Lindström | 162/272 |
| 4,821,384 | 4/1989 | Arav | 29/113 |
| 4,827,584 | 5/1989 | Pav et al. | 29/116 |
| 4,837,907 | 6/1989 | Roerig et al. | 492/7 |
| 4,888,096 | 12/1989 | Cowan et al. | 162/358.1 |
| 4,891,874 | 1/1990 | Roerig et al. | 492/7 |
| 5,021,124 | 6/1991 | Turtinen et al. | 162/272 |
| 5,060,357 | 10/1991 | Roerig et al. | 29/113 |
| 5,111,563 | 5/1992 | Brown et al. | 29/116 |
| 5,127,141 | 7/1992 | Roerig et al. | 29/116 |
| 5,193,258 | 3/1993 | Brown | 492/7 |
| 5,242,361 | 9/1993 | Brown et al. | 492/7 |
| 5,273,626 | 12/1993 | Niskanen et al. | |

FOREIGN PATENT DOCUMENTS

| | | | |
|---|---|---|---|
| 1016116 | 9/1957 | Germany | 162/358.1 |
| 2-67765 | 3/1990 | Japan . | |
| 3-61044 | 9/1991 | Japan . | |
| 5-507130 | 10/1993 | Japan . | |
| 8-507515 | 9/1998 | Japan . | |

*Primary Examiner*—David P. Bryant
*Assistant Examiner*—Marc W. Butler
*Attorney, Agent, or Firm*—Raymond W. Campbell; Gerald A. Mathews

[57] ABSTRACT

A controlled deflection roll has a roll shell which is hydrostatically radially supported by internally disposed hydrostatic shoes. In order to axially position the roll shell, a mechanical locating link is provided which is disposed externally of the roll shell. The link is coupled at one end to an element attached to the roll shell, and is coupled at an opposite end to a fixed support, such as a floor stand. The end of the roll at which the locating link is disposed is thus axially fixed, while the opposite end of the roll remains free to float. The locating link can be connected to an oscillator to oscillate the roll shell axially during operation so as to distribute any non-uniformities in the roll shell and thus to mitigate their effect on the sheet.

4 Claims, 2 Drawing Sheets

SELF LOADING CONTROLLED DEFLECTION ROLL

This application is a continuation of application Ser. No. 08/291,381 filed on Aug. 16, 1994 abandoned.

BACKGROUND OF THE INVENTION

1. Field of the Invention

The present invention is directed to a hydrostatic self-loading controlled deflection roll, and specifically to an apparatus for axially locating the shell of such a roll.

2. Description of the Prior Art

Pairs of rolls forming a nip through which a traveling web passes are used at many locations in a papermaking machine, particularly in the press section to mechanically remove water from the web. In such nips, one or both rolls are loaded, i.e., the roll is mechanically forced toward the nip in order to exert a desired amount of pressure on the web as it travels through the nip. It is also necessary to be able to mechanically retract the rolls of a nip away from each other, so as to open the nip. Such retraction is necessary not only to be able to control the nip pressure, but also as part of the start-up procedure for the papermaking machine either at the beginning of a new production run, or after a sheet break. The start-up procedure involves the cutting and threading of a "tail" through the machine at a speed which is sometimes significantly slower than the normal operating speed of the machine. However, the tail threading procedure can also be accomplished at full machine speed. During this start-up procedure, a nip will not be loaded at its normal operating pressure. For many years in the papermaking industry, loading of rolls was accomplished by suitable mechanisms disposed at one or both ends of the roll shaft about which the roll rotates. Such mechanisms moved the entire roll on its shaft toward and away from the mating roll in the nip.

In order to provide uniform processing of the entire width of the web in the cross-machine direction as it travels through a web, it is desirable to have the line of contact between the two rolls forming the nip be as straight as possible or, if one of the rolls has a contour which is not a straight line, to have the other roll follow that contour as closely as possible. As improving technology in the papermaking industry permitted papermaking machines to be made increasingly wider in the cross-machine direction, as well as to operate at increasingly faster speeds, the sheer weight of the roll or the roll shell, supported only at its opposite ends, resulted in a slight "sag" of the roll in a central region of the nip, thereby causing the line of contact between the two rolls in a nip to exhibit a non-uniform distance between the rolls along the cross-machine direction.

Controlled deflection rolls were developed in response to this problem. The first generation of such controlled deflection rolls were intentionally loaded at their opposite ends so as to cause the roll shell to exhibit a slight outward bow in opposition to the aforementioned sag, so that the distance between the two rolls in the nip would be uniform along the entire cross-machine width of the nip.

More recently, so-called self-loading controlled deflection rolls have been developed, wherein a number of hydraulically operated shoes are carried on a center shaft disposed inside the roll shell, the shoes being actuatable to move toward and away from the axis of rotation of the roll, so as to push against the inner surface of the roll shell, thereby achieving the desired deflection of the outer surface of the roll shell. The need to provide complicated mechanisms at the opposite ends of the roll to move the roll toward and away from the nip is thereby avoided, and only mechanisms for rotating the roll need to be provided at one or both ends, typically only at one end. Examples of such self-loading controlled deflection rolls are disclosed in U.S. Pat. Nos. 5,193,258, 5,127,141, 5,111,563 5,060,357 and 4,821,384.

Known hydrostatic self-loading controlled deflection rolls, such as described in the above-noted U.S. Pat. Nos. 4,821,384 and 5,060,357, make use of hydrostatic bearing pads which take the form of hydrostatic side or guide shoes. Such hydrostatic bearing pads locate the roll shell axially in a fixed location at one end of the roll, while allowing the position of the roll shell to float at the opposite end, thereby permitting differential thermal expansion between the roll center shaft and the shell to be accommodated.

The use of such hydrostatic bearing pads to axially locate the roll shell, however, requires extra pumping horsepower in order to supply these bearings with hydraulic fluid, and adds costs to the manufacture of the side shoes and the center shaft. The use of such pads also create additional chances for roll failure, because the relatively small diameter capillary tubes which throttle oil flow through the bearing pads are prone to clogging. Moreover, since the side shoes are located inside the roll shell, if maintenance is needed on the bearing pads, access to the interior of the roll shell must be gained.

SUMMARY OF THE INVENTION

It is an object of the present invention to provide a hydrostatic self-loading controlled deflection roll with a means for axially locating the roll shell, which is easy to maintain, is simple in structure, and which is mechanically, rather than hydraulically, operated.

The above object is achieved in accordance with the principles of the present invention in a hydrostatic self-loading controlled deflection roll having a mechanical locating link connected between the bearing box of one end of the roll, and the roll supporting framework. The locating link fixes the position of the roll shell at one end thereof, while permitting the other end of the roll shell to float in order to accommodate thermal expansion of the shell. The locating link can be employed with a driven roll, as well as with a non-driven roll. Moreover, more than one locating link can be used at the same end of a roll, in order to axially fix that end of the roll shell.

The locating link can be coupled to an element attached to the bearing box (or attached to the gear box, if used with a driven roll), by means of a pin arrangement. One end of the locating link can extend between opposed flanges, with a pin extending through the end of the link and the flanges. The opposite end of the locating link can be similarly coupled to the framework. Additionally, the locating link can be made adjustable in length, so as to permit precise location of the end of the roll shell. For example, the ends of the link which are coupled to either the bearing box or the framework can be in the form of internally threaded collars, which receive a threaded rod. By rotating the rod within the threads, the axial length of the overall locating link can thereby be adjusted.

An oscillating drive can be connected to the locating link, so that the locating link, and thus the roll shell, can be axially oscillated during operation of the roll. Such oscillation of the roll shell distributes any non-uniformities in the roll shell which may exist, and will thus mitigate their effect on the sheet as a it travels through the nip of which the roll is a part.

DESCRIPTION OF THE PREFERRED EMBODIMENTS

Figure 1:
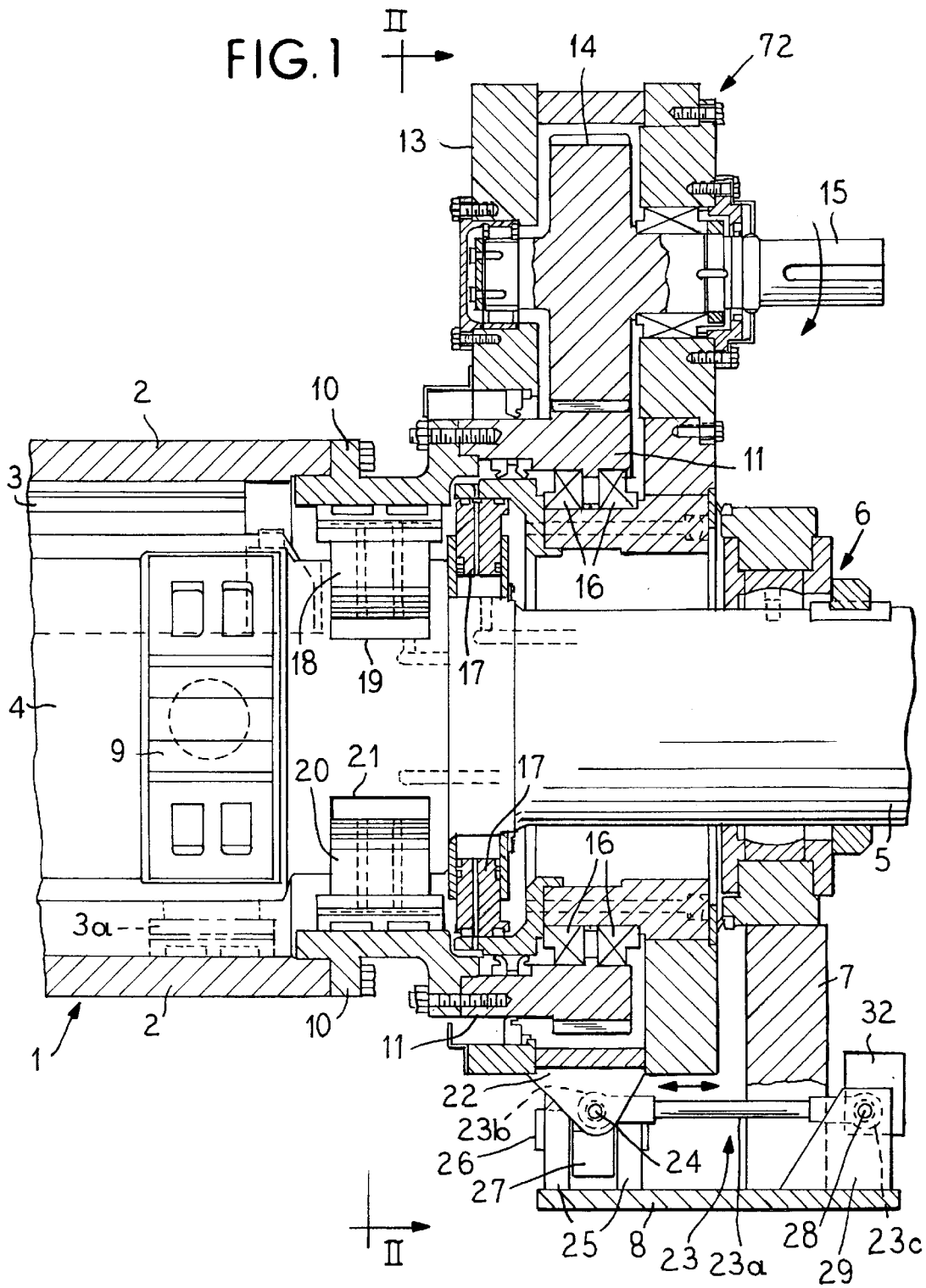
FIG. 1 is a side sectional view of a portion of a hydrostatic self-loading controlled deflection roll having a locating link constructed in accordance with the principles of the present invention.

A portion of a self-loading controlled deflection roll 1 is shown in FIG. 1. In the example of FIG. 1, the roll 1 is a driven roll, and the driven end is shown, however, it will be understood that the principles of the present invention apply equally to non-driven rolls, and the locating link disclosed and claimed herein can be used to equal advantage at a non-driven end of a roll.

The controlled deflection roll 1 has a roll shell 2 which is entirely hydrostatically supported by a loading shoe 3 and side shoes 9 (only one side shoe is shown in FIG. 1). The example of the roll 1 shown in FIG. 1 employs outboard shoes 18 and 20, described in more detail below, for controlling the deflection of the roll shell 2, and thus the loading shoe 3 functions solely to load the shell 2 against an opposing roll (not shown) which will form a nip with the roll 1. The use of the outboard shoes 18 and 20 permits the loading shoe 3 to extend substantially the entire width of the nip loading zone, which is the zone in which pressure is exerted on the sheet as it travels through the nip. As shown in phantom lines, however, multiple, smaller shoes 3a can be used to load the roll shell 2.

The shoes 3, 9 (and, if present 3a) are mounted in bores in a central portion of a center shaft 4. The respective shoes are fed by hydraulic lines in the center shaft 4, which are connected to a hydraulic fluid delivery system (not shown). Each shoe also contains hydrostatic bearing surfaces, which are fed with hydraulic fluid by bores extending through the respective shoes. The roll shell 2 is thus completely radially hydrostatically supported on a thin film of hydraulic fluid.

The center shaft 4 has a stub arbor 5 which extends through a bearing assembly 6, preferably comprising a spherical bushing as shown in FIG. 1, supported on a stand 7 mounted on the floor 8, or some other suitable fixed supporting surface.

The roll shell 2 is bolted to an annular head flange 10 (the opposite end of the roll shell 2 being similarly bolted to a head flange at the opposite end, which is connected to a bearing ring 31 which is part of a bearing assembly for the opposite end of the roll 1). The head flange 10 is bolted to a gear 11 which rotates on tapered bearings 16. The gear 11 is driven by a drive assembly 12, which includes a drive gear 14 contained in a housing 13, the drive gear 14 being rotated by a shaft 15 connected to a prime mover (not shown).

The roll 1 is also provided with barrier seals 17, which are similarly fed by hydraulic lines extending through the center shaft 4 and connected to the aforementioned fluid delivery system. It is contemplated that plain seals, which do not require fluid, can also be used.

As noted above, control of the crown of the roll shell 2 is accomplished in the example shown in FIG. 1 by outboard shoes 18 and 20, which are respectively received in bores 19 and 21 in the center shaft 4. The bores 19 and 21 are fed with hydraulic fluid via conduits in the center shaft 4, also connected to the aforementioned hydraulic fluid delivery system. The outboard shoes 18 and 20 each have hydrostatic bearing surfaces bearing against the inside surface of the head flange 10. The head flange 10 transmits the forces generated by the shoes 18 and 20 to the roll shell 2, so as to control the deflection thereof.

Because the roll shell 2 is thus completely hydrostatically radially supported, and since such hydrostatic support is, by its nature, substantially frictionless, the aforementioned bearing pads which bear against the inner surface of the rolls shell 2 (or the inner surface of the head flange 10) will not be capable of positioning the roll shell 2 axially, nor will such hydrostatic bearings provide any opposing force to any axial thrust load which may be present.

In order to axially position the roll shell 2, therefore, a mechanical locating link 23 is provided, which mechanically axially fixes one end of the roll shell 2. The locating link 23 is completely mechanical and thus does not contribute to the complexity of the hydraulic system. Moreover, the locating link 23 is disposed completely externally of the roll shell 2, and thus is easily accessible for maintenance and adjustment.

The mechanical locating link 23 includes a shaft 23a received in collars 23b and 23c at its opposite ends. The ends of the shaft 23a may be threaded, and the bores in the collars 23b and 23c in which those ends are received may be threaded in a complementary manner, so that when the shaft 23a is rotated the overall length of the shaft and collars combination can be adjusted axially.

The collar 23b is received between downwardly extending flanges 22, which are attached to the housing 13 (i.e. gear box) of the roll 1. The collar 23b is held between the flanges 22 by a pin 24. Similarly, the collar 23c is held between upwardly extending flanges 29, which are rigidly attached to the floor 8. The collar 23c is held between the flanges 29 by a pin 28. Since the flanges 29 are rigidly attached to the floor 8, the locating link 23 rigidly fixes the end of the roll shell 2 at which the link 23 is disposed relative to the floor 8. The opposite end of the roll shell 2 is not similarly axially fixed, and thus is free to float to accommodate thermal expansion of the roll shell 2. The locating link 23 may, however, be disposed at the opposite end of the roll shell 2, at the bearing box located at that opposite end, instead of at the driven end of the roll 1 as shown in FIG. 1. The bearing box (not shown) essentially corresponds to gear box 13, but without the gears. Only one end of the roll shell 2 will, however, be axially fixed, i.e., a locating link will never be used at both ends of a roll simultaneously.

Although a single locating link 23 is shown in the embodiment of FIG. 1, if necessary multiple locating links 23 can be disposed at the same end of the roll.

If desired, a mechanical oscillator 32 can be provided, in driving connection with the locating link 23, so as to mechanically oscillate the locating link 23 during operation of the roll 1. By axially oscillating the locating link 23, and thus also axially oscillating the roll shell 2, non-uniformities in the roll shell 2 can be distributed in the cross-machine direction, and thus their effect on the sheet traveling through the nip, of which the roll 1 forms a part, will be mitigated.

Figure 2:
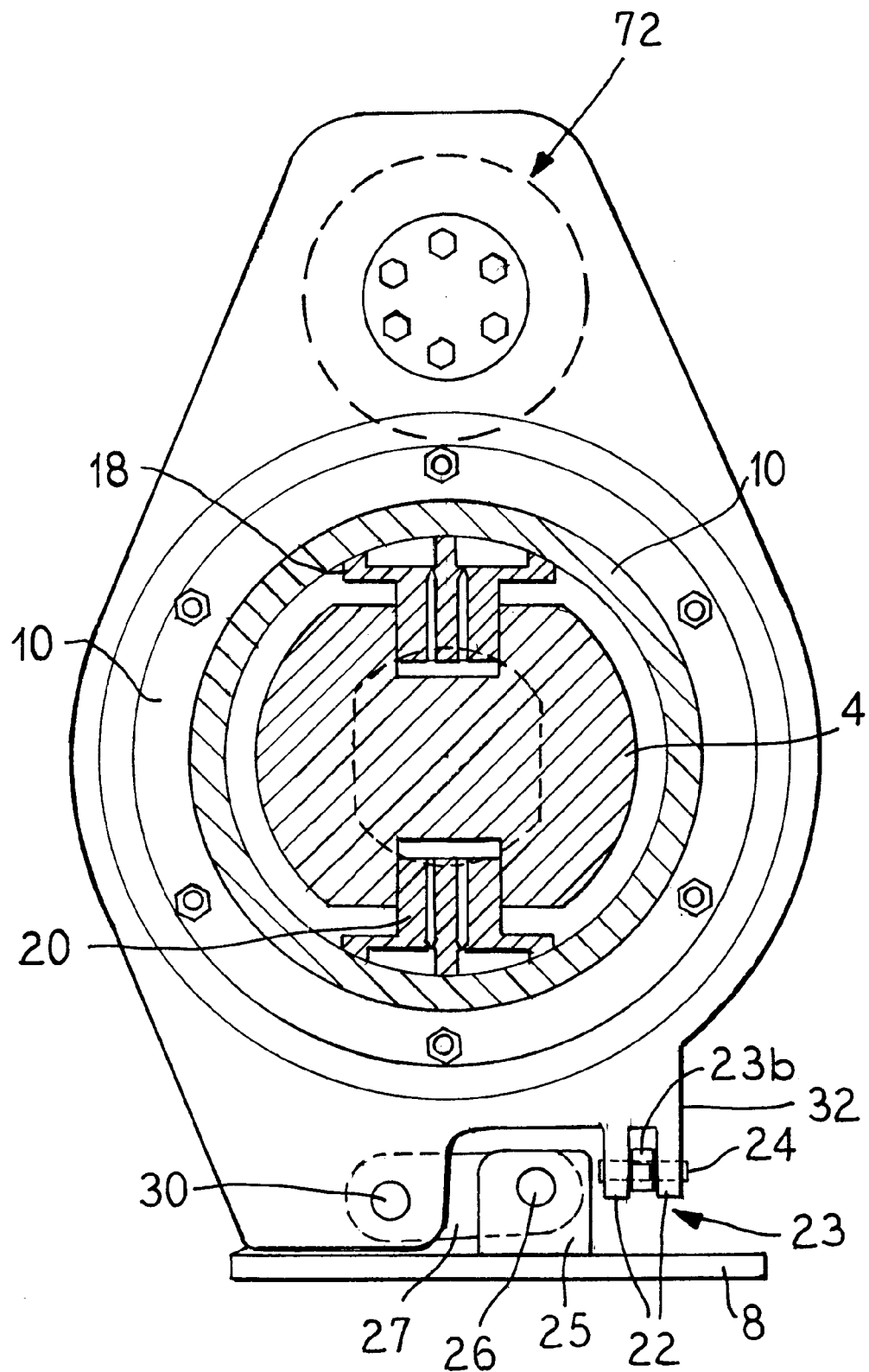
FIG. 2 is a section taken substantially along the line II—II in FIG. 1.

As also shown in FIG. 1, and as can be seen in FIG. 2, torque link 27 is used to oppose torque generated by gear drive forces on the gear box in order to hold the gear box stationary such that it will not rotate about the axis of the roll. The torque link 27 is held by a pin 26 between upwardly extending flanges 25, which are rigidly attached to the floor 8, and the opposite end of the torque link 27 is pinned by a pin 30 to flanges which are a part of the surrounding structure of the roll 1. A similar torque link 27 is disposed at the opposite end of the roll 1.

The locating link 23 can be seen in end view in FIG. 2.

Although modifications and changes may be suggested by those skilled in the art, it is the intention of the inventors to embody within the patent warranted hereon all changes and modifications as reasonably and properly come within the scope of their contribution to the art.

In this regard, it is contemplated that, as an alternate embodiment, link 23 for locating the roll shell could be disposed within the roll shell, such as, for example, by extending flanges 22 upwardly to within the apparatus instead of downwardly as shown in FIG. 1. This would change the location of link 23 slightly, but the positioning operation of the apparatus would be the same as described above.

We claim as our invention:

1. A self-loading controlled deflection roll comprising, in combination:

a support stand disposed at either end of the roll;

a hollow roll shell having an inner cylindrical surface;

a center support shaft extending axially through the roll shell and spaced from the inner cylindrical surface, the center support shaft having a stub arbor at least at one end thereof;

a bushing bearing assembly mounted in the support stand at least at the stub arbor end of the roll, the bushing bearing assembly receiving the stub arbor for permitting the center shaft to be supported while permitting deflection of the center shaft relative to the support stand and the roll shell;

a housing disposed over the shaft near either end thereof;

bearing means rotatably linked with each end of the roll shell for rotatably mounting the roll shell, each bearing means including a head flange co-axially mounted to the roll shell and extending axially outwardly therefrom, and into the housing, a bearing ring mounted in the housing at least at one end of the roll, and a bearing mounted on the bearing ring for receiving the head flange to rotatably support the roll shell in the housing;

a gear connected to the head flange;

drive assembly means connected to the housing and including a drive gear for engaging said gear connected to said head flange for imparting drive torque to said head flange and for rotatably driving the roll shell;

axially adjustable locating link means having one end thereof fixed with respect to the roll assembly and the other end thereof directly connected to the housing and roll shell so that the housing and roll shell may be axially adjusted to the center support shaft;

torque link means connected to both the housing and the locating link means external of the roll, and arranged so as to oppose the drive torque generated by the drive assembly so that the drive assembly will not rotate about the axis of the roll, while simultaneously permitting the locating link means to adjustably operate.

2. A self-loading controlled deflection roll as claimed in claim 1, wherein said locating link is axially adjustable in length.

3. A self-loading controlled deflection roll as claimed in claim 1, further comprising means for axially oscillating said locating link to axially oscillate said roll shell.

4. A self-loading control-deflection roll as claimed in claim 1, wherein said locating link means comprises:

a rod having first and second ends;

first collar means adjustably connected to said first end of said rod, and second collar means adjustably connected to said second end of said rod;

first flange means attached to said housing and receiving said first collar means in mounted engagement therewith;

second flange means attached to the support stand and receiving said second collar means in mounted engagement therewith;

whereby movement of the rod relative to the first and/or second collar means adjustably changes and maintains the fixed location of the housing relative to the support stand.

* * * * *